(12) United States Patent
Bertram et al.

(10) Patent No.: US 6,301,528 B1
(45) Date of Patent: Oct. 9, 2001

(54) METHOD AND DEVICE FOR CONTROLLING ELECTRIC CONSUMERS IN A MOTOR VEHICLE

(75) Inventors: Torsten Bertram, Düsseldorf; Clemens Schmucker, Tamm; Rolf Maier-Landgrebe, Kernen; Torsten Baumann, Massenbachhausen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,281
(22) PCT Filed: Sep. 25, 1999
(86) PCT No.: PCT/DE99/03100
 § 371 Date: Aug. 15, 2000
 § 102(e) Date: Aug. 15, 2000
(87) PCT Pub. No.: WO00/35714
 PCT Pub. Date: Jun. 22, 2000

(30) Foreign Application Priority Data

Dec. 15, 1998 (DE) ................................. 198 57 916

(51) Int. Cl.$^7$ ................. G05D 1/00; G06F 7/00
(52) U.S. Cl. ................. 701/1; 701/36; 307/9.1; 180/65.1; 700/286
(58) Field of Search ................. 701/1, 22, 36; 307/9.1, 10.1; 700/286; 180/65.1

(56) References Cited

U.S. PATENT DOCUMENTS 5,351,776 * 10/1994 Keller et al. ................. 180/79.1
5,991,669 * 11/1999 Dominke et al. ................. 701/1

* cited by examiner

Primary Examiner—William A. Cuchlinski, Jr.
Assistant Examiner—Yonel Beaulieu
(74) Attorney, Agent, or Firm—Walter Ottesen

(57) ABSTRACT

A method and an arrangement for controlling electrical consumers in a vehicle are suggested with a control structure being provided for the consumers, the control structure including at least a higher-ranking consumer management which receives requests from the consumers with respect to the consumer power individually or as sums. The control structure further includes a coordinator for the vehicle electrical system and the power generation thereof, the coordinator receiving the sum of the requested electric consumer power from the consumer management. The coordinator of the vehicle electrical system adjusts the requested electric power via orders to the vehicle electrical system components and the consumer management takes the generated electrical power via control of the consumers.

10 Claims, 5 Drawing Sheets

METHOD AND DEVICE FOR CONTROLLING ELECTRIC CONSUMERS IN A MOTOR VEHICLE

FIELD OF THE INVENTION

The invention relates to a method and arrangement for controlling electrical consumers in a vehicle.

BACKGROUND OF THE INVENTION

For example, methods and arrangements are known from DE-C 39 36 638 wherein, depending upon the on-board voltage, electrical consumers are switched off in groups with a view to the charge balance of the battery. One group is always completely switched off. The arrangement of the groups is static, that is, a specific consumer always belongs to the same group. Furthermore, the reverse case is not covered, namely, that electrical consumers are switched on, for example, because of drive train requirements.

Accordingly, it is necessary to provide a consumer control wherein the switching on and switching off of electrical consumers is coordinated via a higher-ranking consumer management in the context of: a total vehicle control, a vehicle electrical system or an energy management.

A total vehicle control is, for example, described in DE-A 41 11 023 (U.S. Pat. No. 5,351,776), which exhibits a hierarchical command structure for the control tasks. The control structure described there Includes coordination elements which convert a command, which originates from a higher hierarchical level, into commands for elements of a subordinated hierarchical level. The contents of the commands, which are transmitted from above downwardly into the hierarchical structure, define physical quantities which determine the interfaces between the individual hierarchical levels. The described interfaces orientate themselves to the physical conditions of the movement of the motor vehicle and especially of the drive train and of the brakes. A view of a vehicle control which goes beyond the latter while considering the control of the consumers or the energy distribution in the vehicle electrical system is not described.

The principle of a hierarchical base structure of a vehicle total system is known from U.S. Pat. No. 5,991,669. There, a vehicle coordinator is the command giver for the components "drive" (source of mechanical power), "vehicle motion", "chassis and interior space" and "vehicle electrical system" (source of electrical power). The communication between the individual components of this structure takes place only between the higher-ranking component and the components, which are assigned thereto, in the context of fixed pregiven communication relationships. These relationships are the following: the order which is basically given by a component in a higher hierarchical level to a component in a lower hierarchical level and which must be executed by the ordered component; the request which also is given by a component in a lower hierarchical level to a component in a higher hierarchical level and which should be executed by the requested component; and, the inquiry for which an answer is expected from the questioned component to the questioning component. The control of the vehicle takes place in the context of these pregiven communication relationships between the components. For the control of the vehicle, fixed pregiven physical quantities are transmitted which constitute defined interfaces between the individual components. A configuration of the coordinator of the electrical vehicle system or information as to the involvement of the control of electrical consumers is not shown.

SUMMARY OF THE INVENTION

In the context of a higher-ranking vehicle electrical system management or energy management, the consumer management has the task to request the electrical consumer power and to distribute the allocated electrical power to the individual electrical consumers. With the consumer management, a coordination, as optimal as possible, of the drive train, power generation, power storage and power consumption is achieved.

By tying the consumer management into a hierarchical total vehicle structure, a greater overview of the total system and of the consumer control system is achieved and a modular development of software is made possible.

It is especially advantageous that the structure of the consumer management is especially simple. The interfaces between the individual components and the exchanged quantities are strictly of a logical nature, that is, they are independent of hardware and independent of realization. In this way, the following advantages are provided: the reusability of software, an easy expansion, an excellent overview and an easy applicability.

It is further advantageous that the interrelationship of generator, voltage controller, electrical consumers, batteries and possibly present DC/DC converters is coordinated as well as, as required, a coordination with the drive train can be made available.

In the context of the higher-ranking electrical vehicle system management, the consumer management has the task to request electrical power, distribute allocated electrical power and to coordinate the switching time points of the consumers in order to prevent impermissible switching peaks (for example, by simultaneous switching of consumers with start-up current (electric motors, lamps . . . )). In this way, a coordination of all consumers is achieved which is optimized with a view to consumption and comfort depending upon request.

It is advantageous to realize the power allocation via software-triggered actuator interventions at the consumers. This can be the hard switch-on and switch-off of consumers or, for example, a drive of the electrical consumers by means of pulsewidth modulation.

Data as to the consumers are necessary for the allocation of the electrical power and the coordination of the consumers. For this reason, priorities for classification are assigned to all electrical consumers. Here, at least three priority steps are to be distinguished (a finer subdivision is conceivable): safety-relevant consumers and consumers which cannot be acted upon by actuating elements have the highest priority. Switched in consumers having the highest priority define the basic load, that is, the minimum necessary electrical power for the operation of the vehicle which is to be made available under all circumstances. These consumers are, in part, not controllable via the vehicle power system management (power distribution not via vehicle electrical system management); instead, the consumers are directly hard wired. The powers of these consumers are, however, to be considered in the power balance of the vehicle electrical system management. Consumers which are controllable to a limited extent have mid priorities, that is, consumers having low time constants such as, for example, interior blower and radio. A control intervention is here rapidly realizable via the operator. The controllable consumers having large time constants, such as heaters, have the lowest priority. These consumers are suitable for a comfort-neutral control because interventions are not immediately perceivable to the user. The priorities change dynamically depending upon the state of the consumer. Thus, a consumer, which had been reduced in power by the consumer management, changes over into a higher priority stage as soon as a function change is perceivable. In an advantageous manner, a variable control of the consumers on the basis of the pregiven priority distribution is possible by means of the consumer management.

BRIEF DESCRIPTION OF THE DRAWINGS

Embodiments of the invention are shown in FIGS. 1 to 5 and are explained in greater detail in the following description. If power is discussed in the description of the embodiments, it is understood, as a rule, to be the electrical power.

DESCRIPTION OF THE PREFERRED EMBODIMENTS OF THE INVENTION

The structure of the consumer management is dependent upon the structure of the total vehicle electrical system management. In the following, two embodiments are described (see FIGS. 1 and 2).

Figure 1:
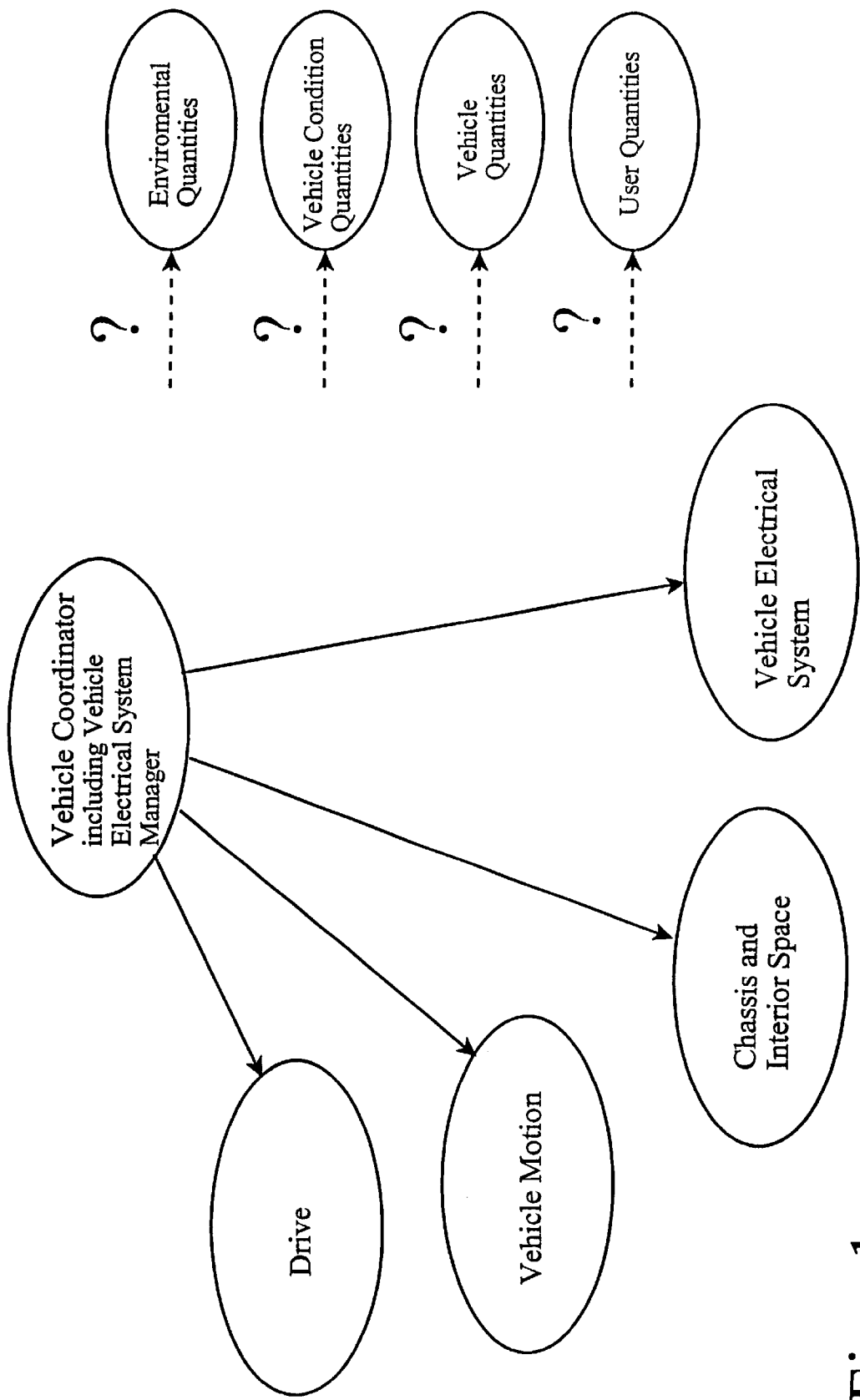

FIG. 1 shows a first embodiment of a total vehicle control. This embodiment is known essentially from the state of the art mentioned initially herein. FIG. 1 shows a total vehicle coordinator which includes the vehicle electrical system manager for controlling the generation of energy and the distribution thereof. FIG. 1 also shows the following: the control components for the drive, for the vehicle movement, for the chassis and the interior space as well as for the vehicle electrical system which are all assigned to the total vehicle coordinator. The communication relationships known from the state of the art are present between the coordinator and the components. Electrical consumers are contained in all of the components. For this reason, the consumer management is distributed to all components in this embodiment including the vehicle coordinator.

Figure 3:
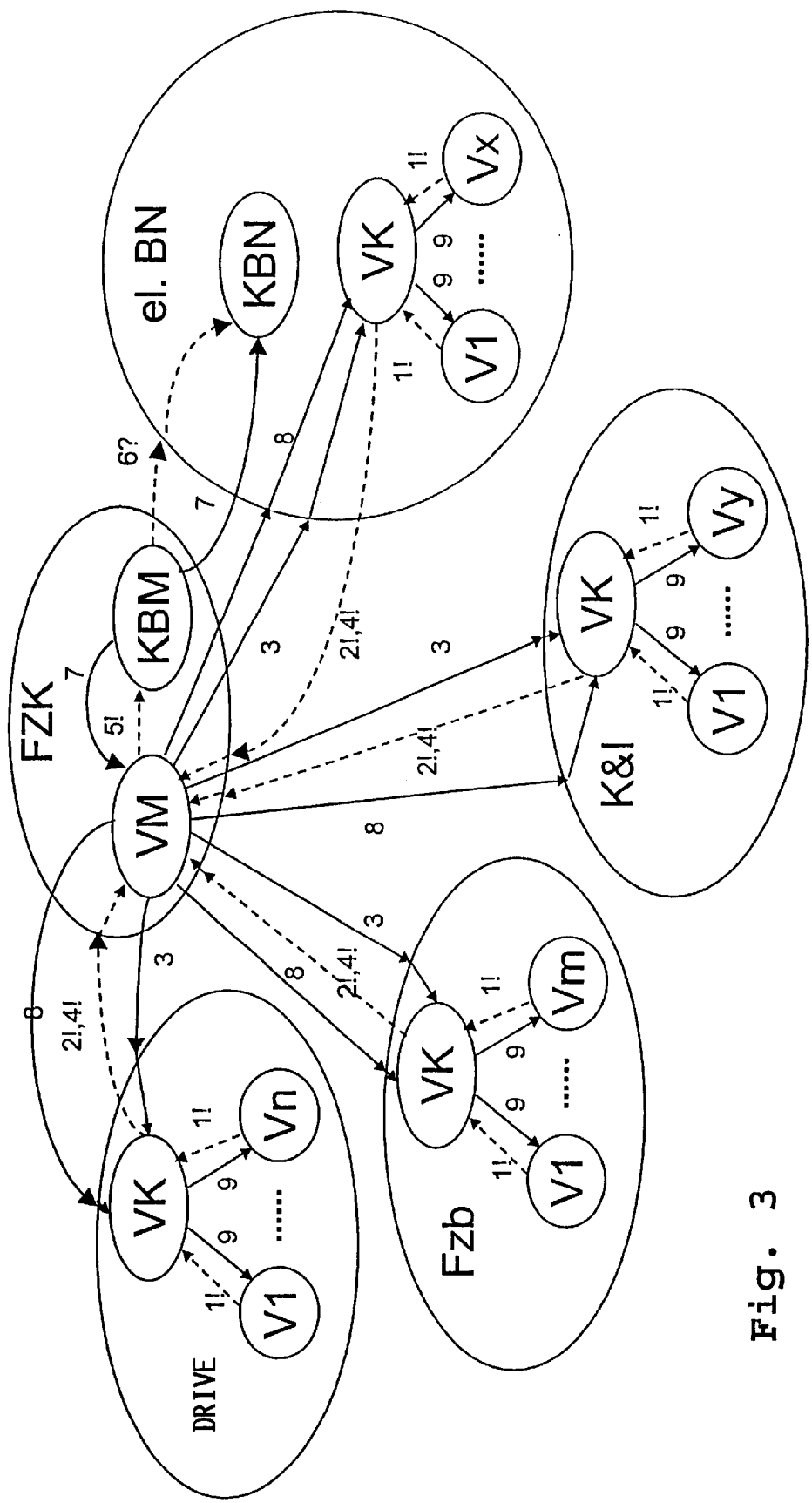

In the following, the power request: of the consumers is described with respect to FIG. 3. Under rated power, the electrical power is understood in the following which an electrical consumer requires in the desired steady-state operating condition. The rated power can be dependent upon the selected stage (for example, blower stages 1 to 3, desired windshield wiper speed, et cetera).

The individual electrical consumers (V1 to Vn (for example, electrical water pump, electrical motor cooling blower), V1 to Vm (for example, electrical hydraulic brake, electrical power steering), V1 to Vy (for example, seat heater, interior space blower), V1 to Vx (electrical consumers in the vehicle electrical system are not known at the present time but were provided for the sake of completeness) of the vehicle components request electrical power at the consumer coordinator VK of the particular component (symbolized by the communication relationship 1!). For each vehicle electrical system voltage which is available, this power request includes the rated power of the consumer, its lowest power which is required for the operation (for example, electrical power to overcome static friction in electric motors) and its peak power (for example, starting current) when switching including the dynamic performance (characteristic values). These three values characterize the electrical consumers installed in the vehicle and are pregiven for each consumer, for example, as a table.

The consumer coordinator VK sets priorities for the consumers and summarizes the power requirements in dependence upon the priorities. These priorities are in accordance with a pregiven allocation which can be changed depending upon the application. The peak powers are additionally classified in order to simplify their allocation by the vehicle coordinator to the components. In the allocation, it must be known how the requested peak power is made up, that is, whether, for example, the power request originates from one or several consumers of a component and how the request is apportioned to the individual consumers. The classification is possible, for example, with reference to the difference power $\Delta P$ ($\Delta P = P_{max} - P_{des}$, wherein: $P_{max}$ is the absolute value of the power peak, $P_{des}$ is the requested rated power). The number and width of the classes are fixed in dependence upon the application and corresponding to the consumers utilized. As an additional distinguishing feature, the indication of the number of peak power zonsumers per class is conceivable.

In this way, the following quantities result for each priority: requested summation power (rated power and the portion of the peak power with time constants greater than the cycle time of the vehicle electrical system management), summed peak power (peak power with a time constant less than the vehicle electrical system management cycle time) and the lowest power which the component can process as the smallest unit (allocated power is either zero or equal to or greater than this lowest power).

The consumer coordinators VK (see FIG. 3) request the determined peak power from the vehicle coordinator (request relationship 2!). The vehicle coordinator sums the requests of the individual components and evaluates the peak power requests with respect to their realizability. A realization example is presented below. The vehicle coordinator allocates the realizable peak power to the individual components (order relationship 3). The components compute the rated power (see below) in dependence upon the allocated peak power and request this rated power together with the corresponding lowest power from the vehicle coordinator (request relationship 4!). The vehicle coordinator compares the request to the power potential, which can be made available, of the vehicle electrical system (for this purpose, the electrical total power is requested by the consumer manager VM from the vehicle electrical system manager KBM (request relationship 5!). The vehicle coordinator inquires at the coordinator "vehicle electrical system" as to the power potential of the vehicle electrical system (inquiry relationship 6?). The electrical power available of the vehicle electrical system is determined by the following: the power generation by the generator, the potential of the battery or batteries and, in multi-voltage vehicle electrical systems, additionally from the configuration of the available DC/DC converters. The vehicle electrical system manager compares request and potential and determines the allocation of the electrical power therefrom.

Depending upon the comparison result, the vehicle electrical system manager gives orders for the generation of power to the vehicle electrical system (order relationship 7!) and for the taking of power to the consumer management which, in turn, outputs orders corresponding to the individual requests to the vehicle components (order relationships 8) and there, to the consumer coordinators VK. The consumer coordinators VK of the individual components then give the orders for the power takeoff 9 to the individual consumers (for example, switching the consumers).

In the following, the comparison of power request to power offered is described in greater detail. First, the peak power comparison is shown. A requested peak power can be realized when the voltage change, which is caused thereby in the vehicle electrical system, remains within specified limits. The check is possible via input of experience values (application quantities, for example, peak power sum <1 kw is basically permissible) or by online simulation of the effect with the aid of a vehicle electrical system model.

If the requested peak power can be realized, the vehicle coordinator allocates the corresponding power to the components (for example, switch-on permission). If the peak power cannot be realized, a maximum permissible peak power is allocated to the individual vehicle components in dependence upon the priority and the adjustability of the peak power. The adjustability of the allocated peak power in the vehicle component can be determined in advance by the vehicle coordinator via the mentioned classification (arranging the peak power requirements into different power classes). The vehicle manager knows the dynamic characteristic quantities of the peak power request. For this reason, a peak power trace can be pregiven, that is, the vehicle electrical system manager allocates a time-dependent trace of the peak power switch-in for a computation cycle of the vehicle electrical system manager. A precondition is that the time interval for the switch-in or switchoff of individual consumers is shorter than the time interval for a cycle of the vehicle electrical system management.

The rated power comparison is carried out as follows. The consumer coordinators of the components determine the needed rated power in dependence upon the allocated peak power. If the allocated peak power corresponds to the requested peak power, then the rated power to be requested is equal to the sum of rated power (the summed rated power request of the consumers corresponding to the components) which is requested by the individual consumers. If the allocated peak power is less than the requested peak power, the power takeoff by the individual consumers is to be so delayed in time that the switching time falls, at the earliest, in the next computation interval of the consumer manager. The consumer coordinator of the component decides as to the peak power allocation to the consumers and computes the consumers, which are not considered, out of the rated power request. The consumer coordinator requests this new rated power sum from the vehicle coordinator.

If the vehicle electrical system can supply the requested rated power, then the vehicle coordinator orders the vehicle electrical system to make the power available and simultaneously orders the components to take the supplied power, that is, to switch the corresponding consumers. The consumer coordinators of the components order the consumers to tare the power.

If the requested consumer power is greater than the power which is available, the vehicle coordinator allocates the power to the components in accordance with a priority list. Here, the minimum power per component is to be considered, that is, the allocated power is either zero or equal to or greater than the minimum power which can still be purposefully utilized by the component. The order flow runs then in the same manner as in the previous case. The distribution of the power, which is allocated to a component, to the individual consumers of the component takes place in the consumer coordinator VK of the component.

Figure 4:
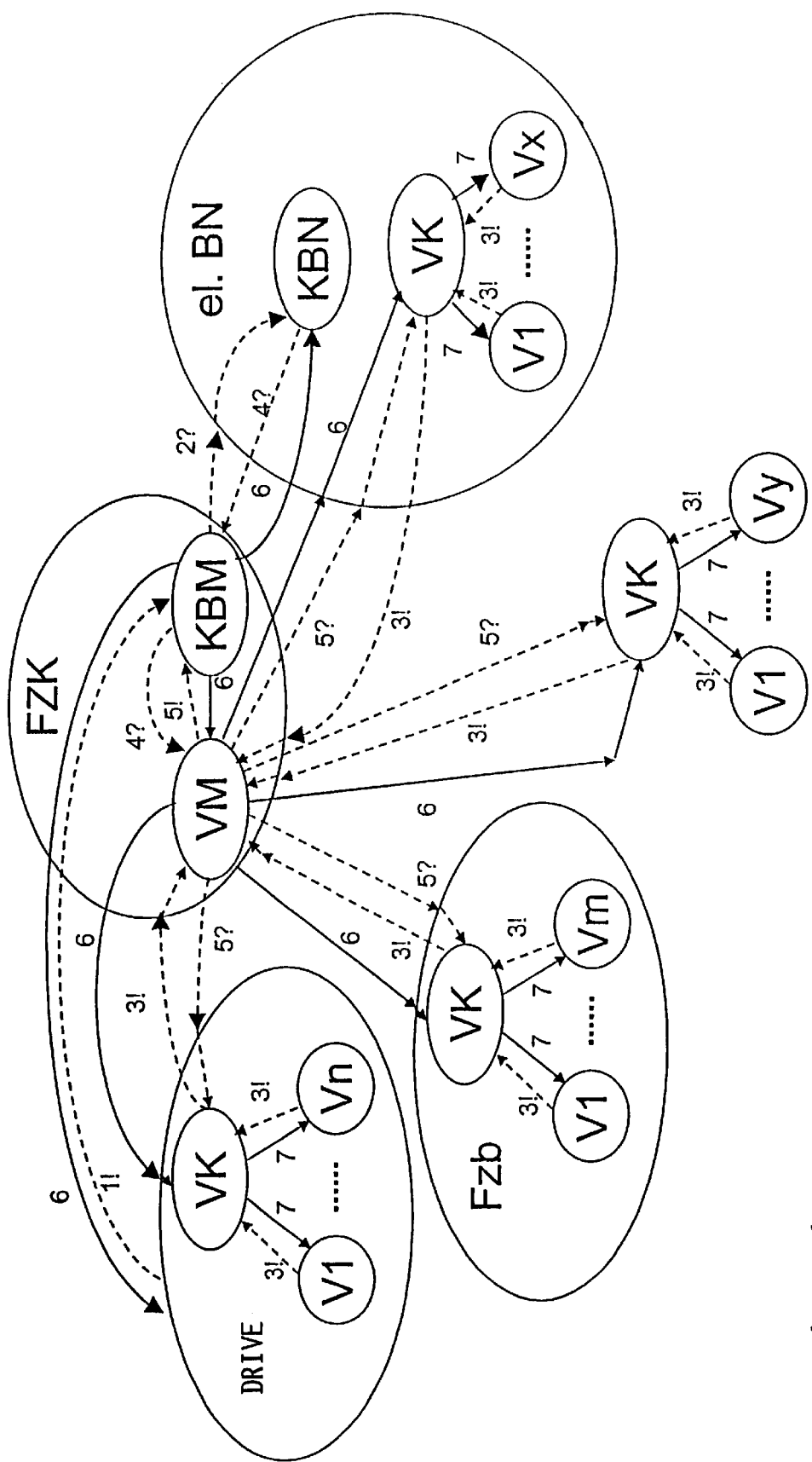

The communication sequence for an oversupply of electric power is shown in FIG. 4. First, the oversupply is determined. For this purpose, the component "drive" and/or "vehicle motion" transmits to the vehicle coordinator (there, the vehicle electrical system manager KBM) a request with respect to a mechanical power (request relationship 1!—in the FIG., only the mechanical request from the drive is shown because of reasons of clarity. For a request by the vehicle movement, the scenario runs the same way) which, for example, can be realized by the generator of the component "vehicle electrical system" (for example, request of greater drive load for the warm-running support or request "brake energy replenishment"). Via an inquiry relationship 2?, the vehicle electrical system manager KBM asks the mechanical power potential of the vehicle electrical system, that is, how much mechanical load the generator can take up in the actual operating point (the mechanical take-up power is equal to the electrical output power divided by the efficiency, that is, the inquiry means the same as the inquiry as to the electrical power potential when the efficiency is known which is here assumed. The efficiency can, for example, be stored as a characteristic field eta=f(n,P, temperature)). via the request relationship 3!, the vehicle coordinator (there, the consumer manager) receives the electrical power requested by the consumers of the individual components via the assigned consumer coordinators VK. If this is less than the electrical power, which is available based on the requested mechanical power, the vehicle coordinator (there, the vehicle electrical system manager or the consumer manager) determines an electrical power excess.

In this case, the electrical power potential of the consuerets is inquired in the vehicle coordinator by the vehicle electrical system manager from the consumer manager via the inquiry relationship 4?. The consumer manager, in turn, asks the electrical potential of the individual consumer via the inquiry relationship 5? from the individual components, there, from the consumer coordinators. The electric potential corresponds to the sum of the available peak power and/or rated power (the electric potential indicates how much electrical power in addition can be taken by switching in or higher switching of consumers while considering a maximum permissible peak power). This electrical power is then requested by the consumer manager from the vehicle electrical system manager (request relationship 5!). The vehicle electrical system manager allocates the electrical power in correspondence to the priorities in that this manager gives orders 6 via the consumer manager to the consumer coordinators for taking the power and to the vehicle electrical system coordinator to generate the electrical power (the electric power which s available with the realization of the mechanical request). The consumer coordinators of the components then order the individual consumers to take the corresponding powers (order 7).

Alternative to the above communication sequence, the possibility is present to request peak power and rated power together, that is, the consumer coordinators of the individual vehicle components request, in one step, the three characteristic consumer quantities (rated power, minimum power and peak power) from the vehicle coordinator. The vehicle coordinator then evaluates the peak power request. If this peak power can be realized, the rated power request is processed. If the peak power cannot be realized, then the realizable power is allocated to the individual components. These individual components correct their rated power request in that they compute the consumers, which are not permitted because of their peak power request, from the rated power request. The corrected rated power is then requested from the vehicle coordinator. The evaluation of the rated power request, the allocation, et cetera, then runs in the same manner as in the scenario already presented.

Figure 2:
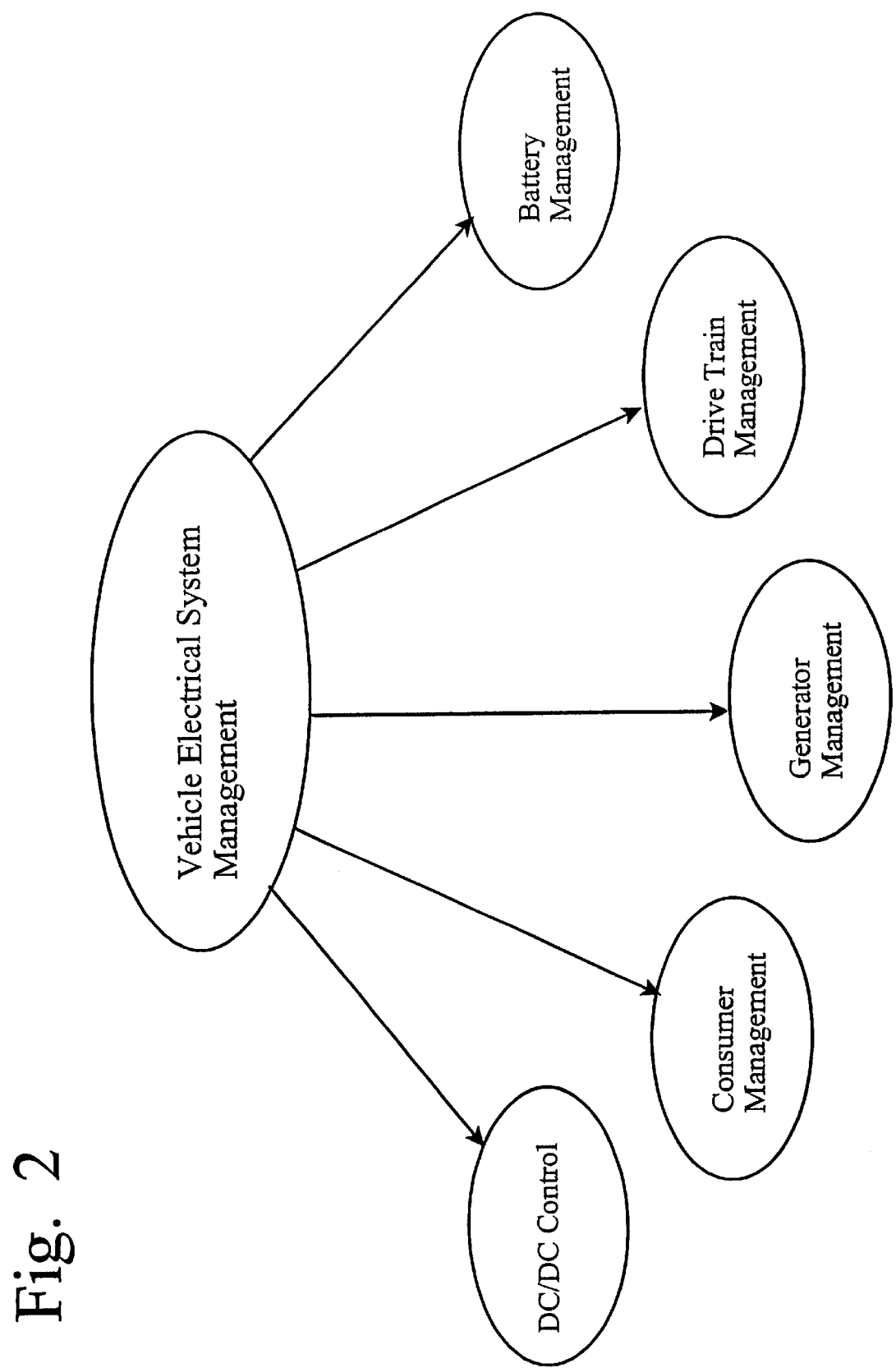

In FIG. 2, a further embodiment for a consumer management is shown. In this structure, it is not the entire vehicle which is viewed but only the part of the vehicle relevant to the vehicle electrical system. The vehicle electrical system manager has or receives knowledge as to the requests of the power generation (communication with the generator management), the requests of the memories (communication with the battery management), the requests of the drive train, the request of the DC/DC converters in the multi-voltage vehicle electrical systems and the requests of the electrical consumers as described below. The individual requests are evaluated and the vehicle electrical system management determines a strategy based on the priority with the target to control as optimally as possible the power generation, power storage, power consumption and the vehicle drive. That is, the vehicle electrical system management fixes which requests are satisfied to what extent. For this decision, the vehicle electrical system manager needs additional information as to the potential of the individual components (drive train, generator, battery, electrical consumers and DC/DC converters). These potentials are inquired, as required, from the vehicle electrical system manager.

All electrical consumers including drive are taken together in a block, the consumer management, and are no longer distributed to different structural blocks. The functionality is identical to the functionality of the consumer management in the first embodiment. The consumers request electrical power from the coordinator of the consumer management. The power request likewise contains the components rated power, lowest power, which is required for the operation (for example, power for overcoming the static friction in electric motors) and peak power (for example, starting current) when switching (inclusive of the dynamic performance (characteristic values)). Likewise, the indication of the voltage level of the consumer is additionally required (for example, 12 volt or 42 volt consumers).

A realization example for the values of the power request is, for example, a table, which is stored in a control apparatus, with all electrical consumers available in the vehicle. For each consumer, this table includes the rated power, the required minimum power, the peak power when switching including dynamic characteristic values and the vehicle electrical system rated voltage to which the consumer is connected (for example, 12 volts or 42 volts). For consumers, which are switchable in steps (for example, the interior blower), each stage is evaluated as an individual consumer. If a consumer is requested, for example by actuating a switch, the values for the consumer management are read out of this table. These power requests are prioritized. The priority is dependent upon the type of consumer and its history.

Thereafter, the peak power requests are summed and separated in accordance with priorities and voltage level. The coordinator of the consumer management requests this peak power sum from the vehicle electrical system management. The vehicle electrical system management evaluates the peak poser request (for example, via online simulation based on a vehicle electrical system model or by evaluating experience values) and allocates the permissible peak voltage separated according to voltage level to the consumer management.

The consumer management distributes the allocated peak power to the requesting consumers. If the permissible peak power is less than the requested peak power, then no allocation to the electrical consumers, which request the peak power and have the lowest priority, takes place.

In the next step, the sum of the rated power requests is formed. This is the sum of the electrical consumers which request power but have no peak power request and simultaneously the rated power of the consumers which had been considered in the peak power allocation. This rated power sum is requested by the consumer management from the vehicle electrical system management.

Depending upon the higher-ranking strategy, the vehicle electrical system management allocates the electrical power to be consumed to the consumer management (each being separated in accordance with voltage level). If it results that more electrical power is to be generated to satisfy the requests than which had been requested by the consumers and the battery (for example, requests of the drive train in accordance with higher load because of the generator), the potential of the electrical consumers must be inquired. This means that the vehicle electrical system management asks the consumer management how much electric power can additionally be taken with switching in or switching up of consumers while considering a maximum permissible peak power. The answer to this inquiry contains the additional electrical power distributed in accordance with priorities and voltage level (for example, 12 volts, 42 volts). The Priorities must not be identical with the priorities of the power request of the consumer. With this information, the vehicle electrical system management is in the position to evaluate the fulfillment of the request and to allocate the electrical power to the consumer management.

If the allocated power is less than or equal to the requested rated power, the coordinator of the consumer management distributes the available power to the requesting consumers having the highest priorities. Requesting consumers having low priorities receive no or a reduced allocation in the event the power, which is available, is not adequate for all consumers. That is, these consumers are not switched in or operate at reduced operation if this is possible because of suitable actuator elements.

If the power, which is to be consumed, is greater than the requested rated power, the consumer management switches on the consumer with the lowest priority, that is, consumers whose switch-in is not realized by the user of the vehicle (for example, the rear window heater) until the allocated power is consumed. As a peripheral condition, it applies that the permissible maximum peak power may not be exceeded.

Figure 5:
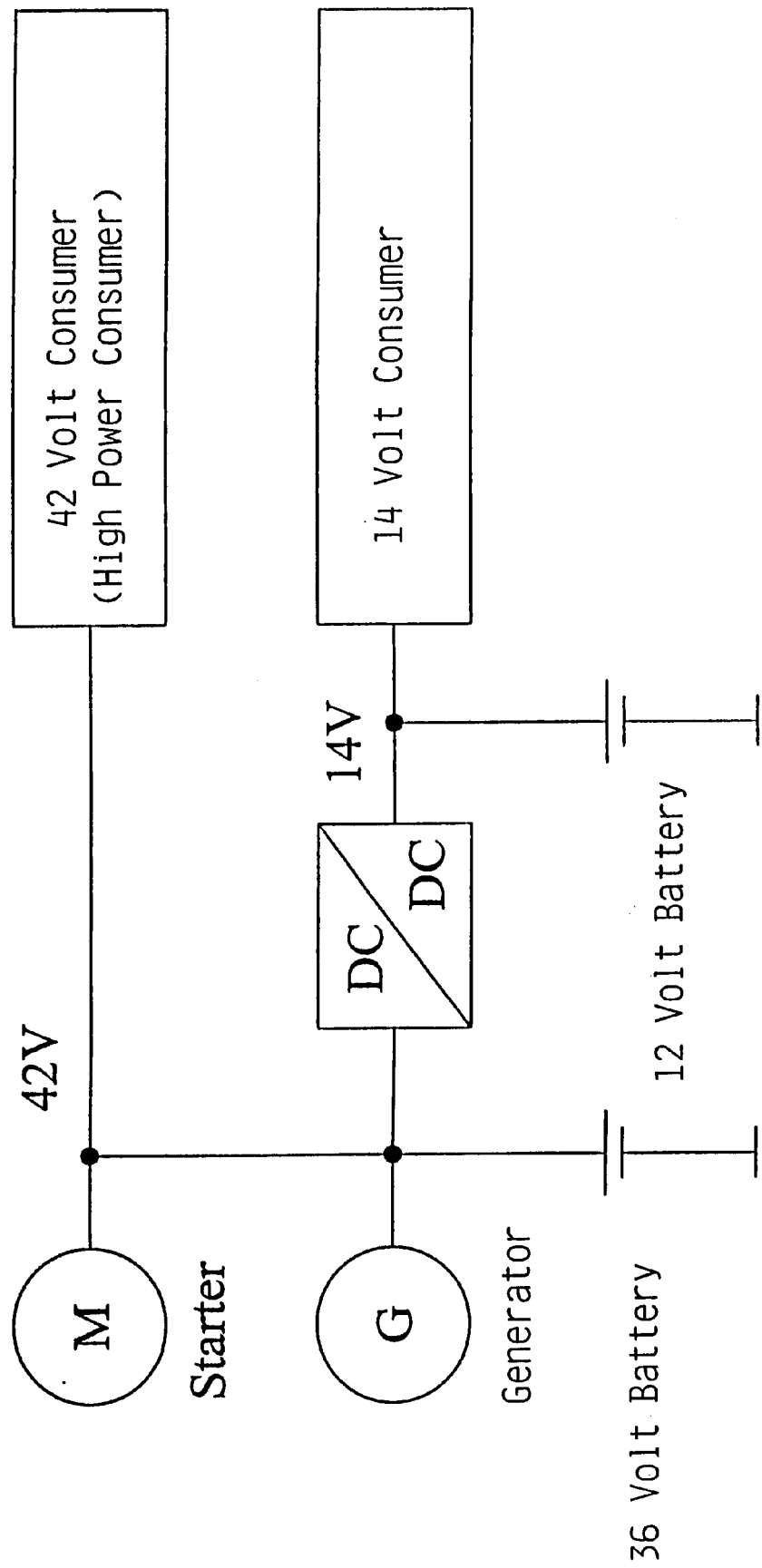

FIG. 5 shows the structure of a two-voltage vehicle electrical system. For example, there are two voltages 14 volts or 42 volts which are given here. The high voltage battery has the task to supply the start power. For the case that the charging state of this battery is not sufficient in order to make possible a vehicle start, the bidirectional DC/DC converter permits the recharge of this battery from the low voltage end. In this case, the vehicle electric system management provides the charging voltage of the high voltage battery as the output voltage for the DC/DC converter. Since the converter is current limited, the charging voltage can only be maintained when the power capability of the converter is large enough. This, as a rule, is not the case. That is, the output voltage of the converter lies below the desired output voltage but still above the actual battery voltage; that is, the total current, which is transmitted by the converter, flows into the battery. A precondition is, however, that no electrical consumers are switched in on the high voltage end during the charging phase. That is, the consumer management must ensure that all consumers on the high voltage end are switched off, at least so many that the voltage, which is applied to the battery, is sufficient for an adequately rapid charge.

What is claimed is:

1. A method for controlling electrical consumers in a vehicle having a control structure for the consumers, a source of consumer power and a vehicle electrical system, the control structure including at least a higher-ranking consumer management which receives requests from the consumers with respect to the consumer power individually or combined as sums, the control structure further including a coordinator for the vehicle electrical system and for the power generation thereof, the method comprising the steps of:

causing the coordinator to receive the sum of the requested electric consumer power from the consumer management;

causing the coordinator of the vehicle electrical system to adjust the requested electric power via orders to the vehicle electrical system components; and, causing the consumer management to take the generated electrical power via control of the consumers.

2. The method of claim 1, wherein the consumers request from the consumer management the electric power as peak power, rated power and lowest power which is necessary for a purposeful operation of the consumer.

3. The method of claim 1, wherein groups of consumers are assembled and each group is allocated to a consumer coordinator which combines the individual requests of the consumers and outputs them to the consumer management.

4. The method of claim 3, wherein the consumer coordinators each form the sums of the requested powers and fix the priorities of the consumers according to an input.

5. The method of claim 4, wherein the consumer coordinators allocate the electric power, which is allocated by the consumer management to the assigned consumers via control of the consumers.

6. The method of claim 1, wherein, for an excess of electrical power, the consumer management distributes the electric power to the coordinators in order to extinguish the excess.

7. The method of claim 1, wherein the consumer management receives separate requests for peak power and rated power, sums the peak power and determines the realizability thereof.

8. The method of claim 1, wherein, for a non-realizable peak power request, the power is allocated to consumers of higher priority and the rated power request is correspondingly corrected.

9. The method of claim 1, wherein the consumer management is subordinated to a vehicle electric system management as a component, the vehicle electric system management coordinating generator, battery, drive train and consumer management with respect to the generation and the distribution of electric power.

10. An arrangement for controlling electrical consumers in a vehicle, the arrangement comprising:

a control structure for the consumers with at least a higher-ranking consumer management which receives requests with respect to consumer power from the consumers, the requests being individually or combined as sums;

a coordinator for a vehicle electric system and the power generation thereof;

said coordinator receiving the sum of the requested electrical consumer power from the consumer management;

said coordinator of the vehicle electric system adjusting the requested electric power via orders to the vehicle electric system components; and, the consumer management taking the generated electric power by controlling the consumers.

* * * * *